Figure 1:
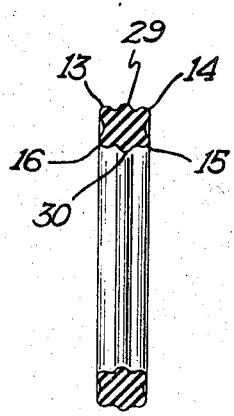

United States Patent

[11] 3,550,990

| [72] | Inventors | John H. Rentschler;<br>Robert W. Carlson, Jr., Edina, Minn. |
|---|---|---|
| [21] | Appl. No. | 838,010 |
| [22] | Filed | June 17, 1969 |
| [45] | Patented | Dec. 29, 1970 |
| [73] | Assignee | Minnesota Rubber Company<br>Minneapolis, Minn.<br>a corporation of Minnesota<br>Continuation of application Ser. No.<br>669,013, Sept. 20, 1967, now abandoned. |

[54] SEALING DEVICE
19 Claims, 5 Drawing Figs.

[52] U.S. Cl...................................................... 277/205,
 277/206, 277/209
[51] Int. Cl...................................................... F16j 15/48
[50] Field of Search........................................... 277/205-
 —211, 206—1, 207A, ATD

[56] References Cited
UNITED STATES PATENTS

| 2,841,429 | 7/1958 | McCuistion.................. | 277/206.1UX |
| 2,873,132 | 2/1959 | Tanner......................... | 277/206.1UX |
| 2,983,533 | 5/1961 | Tisch........................... | 277/209 |
| 3,052,478 | 9/1962 | Horvereid..................... | 277/209 |

Primary Examiner—Laverne D. Geiger
Assistant Examiner—Jeffrey S. Mednick
Attorney—Schroeder, Siegfried & Ryan ABSTRACT: Disclosed herein is a dynamic sealing ring made of a resilient flowable material throughout and characterized by its cross-sectional configuration which in its free form is uniform and generally rectangular and has arcuate smoothly contoured convex lobes at each of its corners with two of its opposed surfaces bearing at least one additional sealing lobe disposed between the corner lobes and separated therefrom by concavities and extending outwardly therebeyond a short distance to effect a more perfect seal, particularly at high pressures, when installed in a groove of dimensions such as to slightly compress the additional sealing lobe and its adjacent corner lobes.

SEALING DEVICE

This application is a continuation of application Ser. No. 669,013, filed Sept. 20, 1967 and entitled SEALING DEVICE and now abandoned.

It is a general object of this invention to provide a novel and improved sealing ring which will perfect a dynamic seal more effectively between a pair of relatively moving surfaces than heretofore possible, especially at higher pressures.

A more specific object is to provide a novel and improved sealing ring made of a resilient flowable material throughout and having a novel and uniform cross-sectional configuration which enables it to perfect a more efficient seal when installed within a groove under compression.

Another object is to provide a novel and improved sealing ring made of a resilient flowable material throughout and having a novel and uniform cross-sectional configuration which when installed within a proper groove not only perfects a more efficient seal but substantially prolong prolongs the life of the seal by substantially reducing the tendency toward extrusion.

Another object is to provide a novel and improved sealing ring made of a resilient flowable material throughout and having a novel and uniform cross-sectional configuration which provides substantially zero leakage at low pressures and greatly reduced leakage at high pressures.

Another object is to provide a novel and improved sealing ring made of a resilient flowable material throughout and having a novel and uniform cross-sectional configuration which will substantially reduce leakage at relatively high pressures by approximately 50—70 percent as compared to similar sealing devices heretofore known.

Another object is to provide a novel and improved sealing device made of a resilient flowable material throughout and having a novel and uniform cross-sectional configuration which by design substantially eliminates the pumping action heretofore known and experienced in the field in similar installations.

Figure 2:
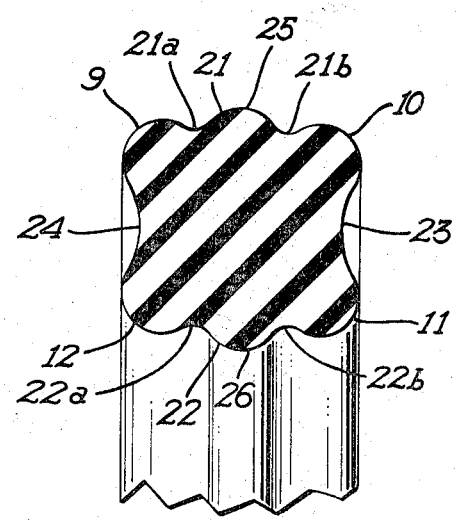
Figure 3:
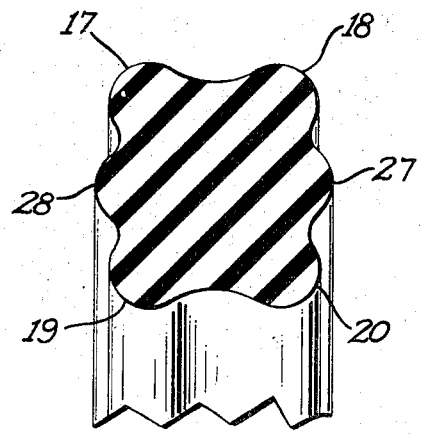
Figure 4:
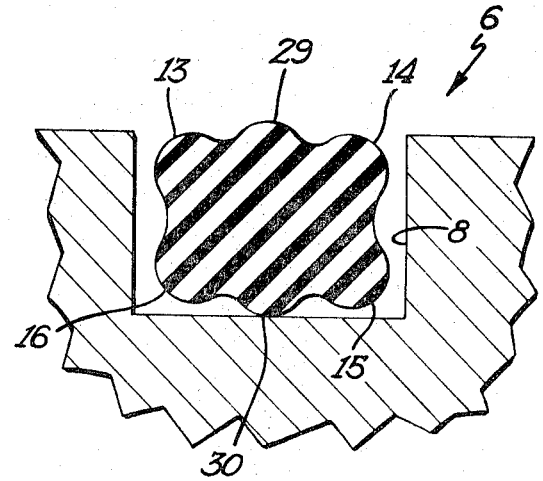
Figure 5:
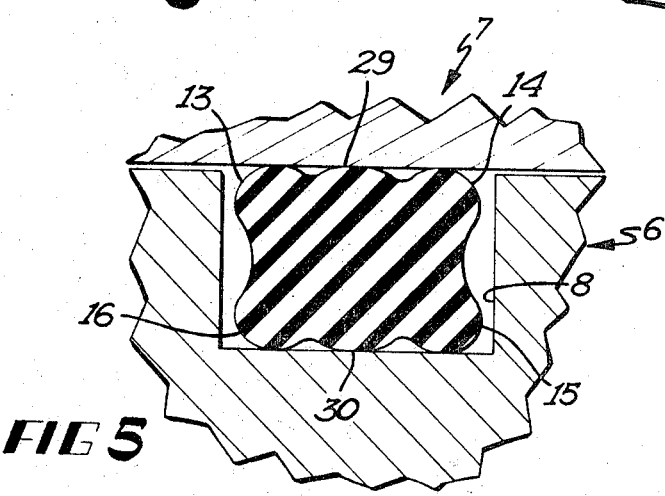

These and other objects and advantages of may my invention will more fully appear from the following description, made in connection with the accompanying drawings, wherein like reference characters refer to the same or similar parts throughout the several views, and in which:

FIG. 1 is a vertical cross-sectional view taken through a sealing ring of our novel design wherein the intermediate and outwardly protruding lobe is carried upon the radially spaced surfaces, FIG. 2 is a fragmentary vertical sectional view of the same on an enlarged scale, FIG. 3 is a corresponding fragmentary vertical sectional view of a ring embodying our design wherein the outwardly protruding intermediately positioned sealing lobe is carried by the axially spaced sides of the ring, FIG. 4 is a fragmentary vertical sectional view of a ring such as shown in FIGS. 1 and 2 disposed within a groove of the proper dimensions for its utilization, and FIG. 5 is a fragmentary vertical view of a sealing ring such as is shown in FIG. 4 installed and under slight compression from the juxtaposed surfaces between which the seal is perfected.

As indicated above, two forms of our invention are shown in the views described above, the outwardly protruding intermediately disposed sealing lobe being carried on the axially spaced sides of the sealing ring in FIG. 3 and being carried on the radially spaced sides in FIGS. 1, 2, 4 and 5. The disposition of the intermediately positioned and outwardly protruding sealing lobe depends upon the type of installation within which the sealing ring is to be utilized, but in any event the outwardly protruding sealing lobe bears against the two surfaces between which the seal is to be perfected. A sealing ring such as shown in FIG. 3 may be utilized, for example, between a pair of flat surfaces within one of which an annular groove has been formed whereas the two surfaces shown in FIG. 5 may be, for example, the juxtaposed surfaces of a cylinder and a piston.

There is shown in the FIGS. described above sealing rings which are made in each instance of a resilient flowable material such as rubber or other elastomeric material adapted to be fitted within a groove between a pair of juxtaposed surfaces such as is shown in FIG. 5. In FIG. 5, there is shown the wall of a piston 6 adapted to be reciprocated within a cylinder wall 7 and having a groove 8 formed therein. It will be noted that the sealing ring shown in each of the FIGS. is generally rectangular in cross-sectional configuration and is characterized by having a lobe at each of its corners. These lobes have been identified by the numerals 9, 10, 11 and 12 in FIG. 2 which shows a ring which is substantially square in cross-sectional dimensions. They have been identified by the numerals 13, 14, 15 and 16 in FIGS. 1, 4 and 5 wherein the axial dimensions exceed the radial dimensions of the cross-sectional configuration of the ring. Likewise, they have been identified by the numerals 17, 18, 19 and 20 in FIG. 3 wherein the outwardly protruding sealing lobe is carried by the axially spaced sides.

Each of the corner lobes 9—20 inclusive is characterized by the fact that its exterior surface is arcuate throughout and convexly shaped. Each of the surfaces extending between the adjacent corner lobes is characterized by the fact that it is concave in configuration with the exception that the two opposed surfaces which bear the sealing lobe carry the outwardly protruding sealing lobe intermediate the two corner lobes and are concave in configuration therebetween.

As shown in FIG. 2, the sealing ring has two sets of opposed surfaces, one set being comprised of the radially spaced surfaces 21 and 22 and the other set being comprised of the axially spaced opposed surfaces 23 and 24. The sealing ring shown in FIG. 2 carries a sealing lobe 25 at its outer surface and a sealing lobe 26 at its inner surface, each of these lobes being arcuate and convexly shaped in configuration and being smoothly contoured. The same description is true with respect to the outwardly protruding sealing lobes 27 and 28 which are carried by the opposed axially spaced surfaces of the ring shown in FIG. 3. Likewise, the sealing lobes 29 and 30 of the sealing ring shown in FIG. 4 which are carried by the radially spaced sides are smoothly contoured and arcuate and convex in shape.

The exterior surface area of the surfaces 21 and 22 which is disposed between the sealing lobes 25 and 26 and their adjacent corner lobes is concavely shaped and smoothly contoured. Thus, there are concavities between these sealing lobes and their adjacent corners that have been identified by the numerals 21a, 21b, and 22a, 22b. It will be noted by reference to the other views that each of the sealing lobes is separated from its adjacent corner lobes by corresponding concavities which for the sake of brevity have not been numbered and which merge tangentially with the convex lobe surface.

It will also be noted that the radius of curvature of the concavities separating the sealing lobes 27 and 28 from their adjacent corners is equal to the radius of curvature of the convex surface of the corner lobes 17—20 as well as that of the sealing lobes 27, 28. Likewise, the radius of the concave surfaces disposed between the sealing lobes 29 and 30 and their adjacent corner lobes is equal to the radius of curvature of the convex surfaces of the corner lobes 13—16 and that of the sealing lobes 29, 30 shown in FIG. 4. In each of these instances, the radius of curvature of the concavities of the two opposed sides which do not carry the sealing lobes is equal to twice that of the radius of curvature of the corner lobes and of the sealing lobes.

It will also be noted by reference to the various FIGS. that in each case the sealing lobes such as 25 and 26 extend outwardly beyond the outer confines of the adjacent corner lobes a distance less than 10 percent of the full dimensions of the outer confines of the sealing ring when taken through the opposed corner of lobes 9, 10, 11 and 12 which bear against the surfaces to be sealed. It will will also be noted that in each instance the volumetric protrusion of the sealing lobes beyond the outer confines of the remainder of the ring is less than the combined volumetric concavities adjacent to said lobes. For example, in FIG. 2, the volumetric protrusion of the sealing lobe 25 beyond the outer confines of the remainder of the sealing ring is less than the combined volumetric concavities 21a and 21b which are disposed adjacent that sealing lobe. Likewise, the volumetric protrusion of the sealing lobe 26 beyond the outer confines of the remainder of the ring is less than the combined volumetric concavities 22a and 22b which are disposed at either side of that sealing lobe. This relationship holds true whether the sealing ring is generally square or rectangular in cross-sectional configuration and irrespective of whether the sealing lobe is carried by the axially spaced sides or the radially spaced sides.

It should also be noted that the radius of curvature of the convexly shaped exteriors of each of the sealing lobes 27, 28 and each of the corner lobes 17—20 approximates 18 percent of the dimensions of the outer confines of said ring when taken through the corresponding opposed corners of the sealing lobe-bearing surfaces. In other words, the radius of curvature of the lobes 17—20 and 27, 28 is 18 percent of the distance between the outer confines of the lobes 17 and 19 or of the radial dimensions of the ring.

It will be noted by reference to FIGS. 4 and 5 that the sealing ring designed in accordance with our invention has dimensions such that in its free form the ring exceeds the depth of the groove so that the sealing lobe will be somewhat compressed as well as the adjacent corner lobes between the two opposed surfaces. The dimensions of the groove when the seal is in its installed state without fluid pressure being applied thereagainst has a volume approximating 60—80 percent of the volume of the groove and has a preferred volume of about 70—75 percent of the volume of the groove. We have found that these volumetric relations provide a most desirable result in sealing efficiency.

We have found from tests which we have run over extended periods that the sealing devices shown and described herein provide a much more efficient seal, particularly at higher pressures, than has heretofore been obtainable. It appears that the presence of the intermediately disposed and outwardly protruding center lobes such as 25—30, which is the outstanding characteristic of this device, is responsible for the improved results. We find that there is substantially zero leakage at low pressures and that the leakage is reduced approximately 50—70 percent at higher pressures. In addition, the life span of the seal is greatly extended in that the normal tendency of extrusion of the corner lobe carried by the side opposite that to which the pressure is applied is greatly diminished with the result that the corner is not nibbled or chewed away gradually until eventually the seal is no longer effective. It appears that the greater mass of resilient flowable material disposed at the outwardly protruding sealing lobes flows within the groove when the ring is installed so as to cause the corner lobes to assume a shape such that the tendency toward extrusion is greatly diminished. In addition, a more perfect seal is provided. Also, we have found that the pumping action heretofore known in the seals wherein the pressure alternately applied from opposite sides is substantially eliminated by the presence of the intermediately disposed outwardly protruding sealing lobes. We believe that since there is a greater mass of material within the center lobe which extends outwardly beyond the corner lobes and is therefore compressed inwardly, the lobe facing the pressure, being of lesser dimension than the center lobe, will tend to spread upon the application of pressure and cause a more perfect seal and give a zero leakage effect. At the same time, the set of lobes disposed away from the pressure side are somewhat protected from the system pressure which the overall seal encounters and this protection is afforded by the mass of rubber in the seal which has been increased as a result of the compression of the intermediately disposed sealing lobes. Therefore, these lobes are not as likely to be forced into the clearance gap between the cylinder and the piston and will have a lesser tendency to extrude. When the pressure shifts from one direction to the other, these lobes being intact and undamaged, are able to make a more effective seal.

We claim:

1. A sealing device comprising a continuously formed ring made of a resilient flowable material throughout and adapted to fit into a sealing groove of ringlike configuration formed in one of a pair of opposed surfaces:
   a. said ring in its free form being uniform and generally rectangular in cross-sectional configuration and including a set of two opposed generally radially extending surfaces and a set of two opposed generally axially extending surfaces connected between adjacent portions of said radially extending surfaces;
   b. a lobe being formed at each of the four corners defined between the adjacent surfaces;
   c. the exterior surface of each of said lobes in their free form being smoothly contoured and arcuately curved in shape;
   d. each surface of one of said sets of two opposed surfaces having a sealing lobe with a smoothly contoured convexly shaped exterior disposed intermediate the corner lobes adjacent that surface and in its free form extending outwardly beyond said adjacent corner lobes; and
   e. the exterior surface area of said intermediately lobed surfaces between said sealing lobe and its adjacent corner lobes being concavely shaped and smoothly contoured.

2. The structure defined in claim 1 wherein the radius of curvature of said concavely shaped surfaces approximates the radius of curvature of the convexly shaped exterior of said sealing lobe.

3. The structure defined in claim 1 wherein the radius of curvature of said concavely shaped surfaces is equal to the radius of curvature of the convexly shaped exterior of each of said sealing lobes and said corner lobes.

4. The structure defined in claim 1 wherein each surface of said remaining set of opposed surfaces is concavely shaped.

5. The structure defined in claim 1 wherein each surface of said remaining set of opposed surfaces is concavely shaped and has a radius of curvature approximating twice the radius of curvature of the convexly shaped exterior of each of said sealing lobes.

6. The structure defined in claim 1 wherein the radius of curvature of said concavely shaped surfaces approximates the radius of curvature of the convexly shaped exterior of said sealing lobes and wherein each surface of said remaining set of opposed surfaces is concavely shaped and has a radius of curvature approximating twice the radius of curvature of the convexly shaped exterior of said sealing lobes and of said corner lobes.

7. The structure defined in claim 1 wherein the radius of curvature of the convexly shaped exteriors of each of said sealing lobes and said corner lobes approximates 18 percent of the dimensions of the outer confines of said ring taken through corresponding opposed corner lobes.

8. A sealing device comprising a continuously formed ring made of a resilient flowable material throughout and adapted to be fitted into a sealing groove of ringlike configuration:
   a. said ring being uniform and generally rectangular in cross-sectional configuration and including a set of two opposed generally radially extending surfaces and a set of two opposed generally axially extending surfaces;
   b. a lobe being formed at each of the four corners defined between the adjacent surfaces;
   c. the exterior surface of each of said lobes in their free form being smoothly contoured and arcuately convex in shape across the entire surface; and
   d. each surface of one of said sets of two opposed surfaces having a sealing lobe with a convexly shaped exterior disposed intermediate the corner lobes adjacent that surface and in its free form extending outwardly beyond said adjacent corner lobes.

9. The structure defined in claim 8 wherein said sealing lobe extends outwardly beyond said adjacent corner lobes a distance less than 10 percent of the dimensions of the outer confines of said ring taken through the corresponding opposed corner lobes.

10. The structure defined in claim 8 wherein the volumetric protrusion of said sealing lobe beyond the outer confines of the remainder of said ring is less than the combined volumetric concavities adjacent to said lobe.

11. In combination:
  a. a pair of relatively movable members having slidably fitted complementary cylindrical working surfaces;
  b. an annular sealing groove having groove-defining walls formed at one of said surfaces and juxtaposed to the other of said surfaces;
  c. a fluid seal positioned within said groove for sealing against fluid pressure between said two movable members;
  d. said fluid seal comprising a circumferentially continuous sealing ring having an axial dimension only slightly less than the axial dimension only dimensions of said groove and having radial dimensions in its free form slightly in excess of the distance from the bottom of said groove to the opposed working surface;
  e. said sealing ring being made of a resilient flowable material throughout and being uniform and generally rectangular in cross-sectional configuration and including a set of two opposed generally radially extending surfaces and a set of two opposed generally axially extending surfaces;
  f. a lobe carried at each of the four corners defined between adjacent surfaces, said lobes bearing against the walls of said groove and said juxtaposed working surface;
  g. the exterior surface of each of said lobes in their free form being smoothly contoured and arcuately convex in shape across their entire surface; and
  h. each surface of one of said sets of two opposed surfaces having a sealing lobe with a convexly shaped exterior disposed intermediate the corner lobes adjacent that surface and bearing against the surface engaged by said corner lobes and in its free form extending outwardly beyond said adjacent corner lobes.

12. The structure defined in claim 11 wherein said seal in its installed state without fluid pressure being applied thereagainst has a volume approximating 60 to 80 percent of the volume of said groove.

13. The structure defined in claim 11 wherein said seal in its installed state without fluid pressure being applied thereagainst has a preferred volume approximating 70 to 75 percent of the volume of said groove.

14. A sealing device comprising a continuously formed ring made of a resilient flowable material throughout and adapted to fit into a sealing groove of ringlike configuration formed in one of a pair of opposed surfaces:
  a. said ring in its free form being uniform and generally rectangular in cross-sectional configuration and including a set of two opposed generally radially extending surfaces and a set of two opposed generally axially extending surfaces connected between adjacent portions of said radially extending surfaces;
  b. a lobe being formed at each of the four corners defined between the adjacent surfaces;
  c. the exterior surface of each of said lobes in their free form being smoothly contoured and arcuately curved in shape; and
  d. each surface of one of said sets of two opposed surfaces having a sealing tongue with a smoothly contoured convexly shaped exterior disposed intermediate the corner lobes adjacent that surface and in its free form extending outwardly beyond said adjacent corner lobes.

15. A sealing device comprising a continuously formed ring made of a resilient flowable material throughout and adapted to fit into a sealing groove of ringlike configuration formed in one of a pair of opposed surfaces:
  a. said ring in its free form being uniform and generally rectangular in cross-sectional configuration and including a set of two opposed generally radially extending surfaces and a set of two opposed generally axially extending surfaces connected between adjacent portions of said radially extending surfaces;
  b. a lobe being formed at each of the four corners defined between the adjacent surfaces;
  c. the exterior surface of each of said lobes in their free form being smoothly contoured and arcuately curved in shape;
  d. at least one surface of one of said sets of two opposed surfaces having a sealing tongue disposed intermediate the corner lobes adjacent that surface and in its free form extending outwardly beyond said adjacent corner lobes.

16. The structure defined in claim 15, wherein said sealing tongue is carried by one of said generally radially extending surfaces and extends axially outwardly therefrom.

17. The structure defined in claim 15 wherein said sealing tongue is carried by one of said generally radially extending surfaces and extends axially outwardly therefrom and the remainder of the surfaces of said two sets of surfaces are concavely shaped between their respective adjacent corner lobes.

18. A sealing device comprising a continuously formed ring made of a resilient flowable material throughout and adapted to fit into a sealing groove of ringlike configuration formed in one of a pair of opposed surfaces:
  a. said ring in its free form being uniform and generally rectangular in cross-sectional configuration and including a set of two opposed generally radially extending surfaces and a set of two opposed generally axially extending surfaces connected between adjacent portions of said radially extending surfaces;
  b. a lobe being formed at each of the four corners defined between the adjacent surfaces;
  c. the exterior surface of each of said lobes in their free form being smoothly contoured and arcuately curved in shape; and
  d. at least one surface of one of said sets of two opposed surfaces having a sealing protuberance disposed intermediate the corner lobes adjacent that surface and in its free form extending outwardly beyond said adjacent corner lobes.

19. The structure defined in claim 18 wherein the exterior surface area between the adjacent corner lobes of each of the remaining surfaces of said sets of two opposed surfaces is concavely shaped.